United States Patent [19]

Borchers et al.

[11] Patent Number: 5,719,342

[45] Date of Patent: Feb. 17, 1998

[54] PROBE WITH UNILATERALLY CANTILEVERED HEAD HOUSING

[75] Inventors: Kerstin Borchers; Heinrich Hansemann, both of Bremen; Herbert Laupichler, Weyhe; Jan-Hermann Müller, Hude; Joachim-Christian Politt, Bremen; Günter Schmitz, Oldenburg; Holger Schröter, Achim, all of Germany

[73] Assignee: GESTRA GmbH, Bremen, Germany

[21] Appl. No.: 726,837

[22] Filed: Oct. 8, 1996

[30] Foreign Application Priority Data

Oct. 27, 1995 [DE] Germany .................. 195 40 034.8

[51] Int. Cl.⁶ .............................................. G01N 37/00
[52] U.S. Cl. .............................................. 73/866.5
[58] Field of Search ..................... 73/866.5, 31.05, 73/53.01, 290 R

[56] References Cited

U.S. PATENT DOCUMENTS

| | | | |
|---|---|---|---|
| 1,593,291 | 7/1926 | Critchlow | 73/866.5 X |
| 3,369,408 | 2/1968 | Bach et al. | 73/866.5 |
| 3,776,027 | 12/1973 | Campbell | 73/649 |
| 3,977,249 | 8/1976 | Wittig | 73/861.67 |
| 4,496,906 | 1/1985 | Clack | 324/439 |
| 4,817,432 | 4/1989 | Wallace et al. | 73/602 |
| 5,018,506 | 5/1991 | Danna et al. | 600/152 |
| 5,100,318 | 3/1992 | Demyun et al. | 433/72 |
| 5,489,774 | 2/1996 | Akamine et al. | 73/105 X |
| 5,527,262 | 6/1996 | Monroe et al. | 600/110 |
| 5,527,444 | 6/1996 | Sweeney, Jr. | 204/415 |

FOREIGN PATENT DOCUMENTS

| | | | |
|---|---|---|---|
| 2913742 | 10/1980 | Germany | 73/866.5 |
| 3035502 | 4/1982 | Germany | 73/866.5 |
| 82 16 323 | 11/1982 | Germany . | |
| 144898 | 6/1993 | Japan | 73/866.5 |

OTHER PUBLICATIONS

*Patent Abstracts of Europe* (WO 09517922A2) dated Jul. 6, 1995 "Introvaginal or Intrarectal Electrode" by Roy Sherlock.

*Primary Examiner*—Thomas P. Noland
*Attorney, Agent, or Firm*—Collard & Roe, P.C.

[57] ABSTRACT

A probe for monitoring a medium within a container, which includes a mounting housing for mounting the probe on a container, a neck part attached at one end to the mounting housing, and at the other end to a radially cantilevered head housing. The head housing extends on only one side of the neck part. A sensor is attached to the mounting housing. An electrical conductor is attached to the sensor and extends through the neck part and into the head housing where it is connected to an electronic circuit, which is mounted inside the head housing. The head housing is made so that its dimensions in the radial direction of the neck part are greater than the dimensions of the neck part. The cantilevered mounting of the head housing allows heat from the container to dissipate into the atmosphere without contacting a significant portion of the head housing. The configuration of the head housing also allows easy access to the electronic circuit, even if two probes are placed in close proximity to each other.

13 Claims, 6 Drawing Sheets

PROBE WITH UNILATERALLY CANTILEVERED HEAD HOUSING

BACKGROUND OF THE INVENTION

1. Field of the Invention

The present invention relates to a probe for monitoring a medium in a container.

In containers on which such probes are intended to be used, there are often very high operating temperatures, such as, for example 300° C. However, the maximally permissible operating temperature of the electronic circuit unit present in the head housing of such probes is substantially lower, e.g. 70° C. The size of the circuit unit and head housing may be relatively large. In order to condition the measured signal of the sensor on the probe for interpretation or further signal transmission, an extensive circuit is frequently required. Such a circuit, however, is also obtained if a circuit amplifier or a similar evaluator is integrated in the circuit unit.

2. The Prior Art

A probe of this type is demonstrated in German Utility Model No. DE-GM 82 16 323. In the prior art probe, a tubular neck part supports a pot-like head housing on its end remote from the container. The tubular neck part thus provides the purpose of creating a temperature-reducing space between the electronic circuit and the container. The radial cooling ribs or fins on the neck part of the known probe have been found to be not advantageous. Due to the installation space available for the probes, there are limits as to the length of the neck part. It has been found that despite the usual thermal insulation of the container within the existing longitudinal limits, the required low temperature for the circuit is not available at high operating temperatures of the container, especially when a large head housing is used.

In some cases, two probes are required at the same time where, for example, one probe continuously monitors the liquid level in the container, and the other monitors a minimum liquid level in the container for safety reasons. It is often found to be desirable to mount both probes on only one flange, and to then mount the flange onto a connecting flange of the container, so that only one single connection is required on the container for both probes. To be able to obtain this with a flange with a usual nominal width, both probes have to be mounted next to each other with very little center spacing. The conventional probes having cantilevered head housings do not make this mounting possible.

SUMMARY OF THE INVENTION

It is therefore an object of the present invention to provide a probe of the type specified above, whose head housing is capable of receiving extensive circuitry, but which is also suitable for use at high operating temperatures.

It is another object of the present invention to be able to mount two probes with very little center spacing.

These and other objects and features of the present invention are obtained with a probe having a unilaterally cantilevered head housing that is adapted to hold large electronic circuits. The probe comprises a mounting housing for mounting the probe on a container, a neck part attached at one end to the mounting housing, and at the other end connected to a radially cantilevered head housing. The head housing extends in the radial direction on only one side of the neck part. A sensor is attached to the mounting housing and extends into the container. An electrical conductor is attached to the sensor and extends through the neck part and into the head housing where it is connected to an electronic circuit unit, which is mounted inside the head housing. The head housing is made so that its dimensions in the direction of the radius of the neck part are greater than the dimensions of the neck part.

Unlike a head housing cantilevered radially beyond the neck part on all sides, the head housing is arranged with unilateral displacement relative to the neck part, and does not obstruct the convection flow of the air surrounding the neck part. Thus, the air convection can take place largely unobstructed. No localization of air develops under the head housing and thus there is no localization of heat that would heat the head housing and the circuit unit therein. Therefore, it is possible to operate at high temperatures using a large head housing. If two probes are to be disposed next to each other, the present invention may be positioned so that the two housings each extend toward the side remote from the adjacent probe. Thus, regardless of the size of the head housing, the probes can be arranged in this way with a small spacing between the mounting housings.

In a preferred embodiment, the head housing is designed as a flat body and arranged in an upright position. With its narrow side facing the container, there is very little surface area facing the convection flow from the initial direction. Only the part of the narrow side located in the immediate proximity of the neck part is subject to the convection flow. Due to the radial alignment of the head housing relative to the neck part, a substantial part of the narrow side is outside of the air flow, especially with large, widely cantilevered head housings. This results in a particularly great temperature difference between the container and the circuit unit.

In another preferred embodiment, the circuit unit is entirely located next to the neck part, which is highly advantageous in view of the temperature. Furthermore, this shape of the housing provides for a particularly good use of the interior space by the circuit unit.

In another preferred embodiment, the head housing is comprised of a frame and two covers. The interior space of the head housing is accessible from two sides; only one or the other cover has to be removed. This is an advantage if the head housing is accessible from only one side, and in a different installation, only from the other side. If two probes are arranged next to each another with very little center spacing, the interior spaces of both probes are accessible from the same side in spite of opposed alignment of the head housings. In addition, it is advantageous if the circuit unit can be selectively mounted in the head housing from the one side or the other side without any changes.

When the covers of the head housing are symmetrically shaped, it is possible to use covers of the same design for both broad sides of the head housing. Regardless of whether the head housing is cantilevered from the neck part to the right or left side, one and the same cover can be used for closing the broad side. This is particularly advantageous if the head housing has indicating and/or operating elements on the broad side.

The present invention permits the use of a head housing that is particularly light in weight but yet dimensionally stable. The present invention also screens out any radiation of electromagnetic waves from the outside to prevent their entrance into the head housing, and also screens out radiation from the head housing emanating to the outside, without additional constructional measures.

In a further preferred embodiment, the head housing is mounted to the neck part by a screw means. The screw means are easily accessible because they are located away from the circuit unit. After the probe has been mounted on the container, the head housing can be swiveled in a simple way into the desired position and thus fixed in place.

BRIEF DESCRIPTION OF THE DRAWINGS

Other objects and features of the present invention will become apparent from the following detailed description considered in connection with the accompanying drawings, which disclose several embodiments of the present invention. It should be understood, however, that the drawings are designed for the purpose of illustration only, and not as a definition of the limits of the invention.

In the drawings, wherein similar reference characters denote similar elements throughout the several views.

DETAILED DESCRIPTION OF THE PREFERRED EMBODIMENTS

Figure 1:
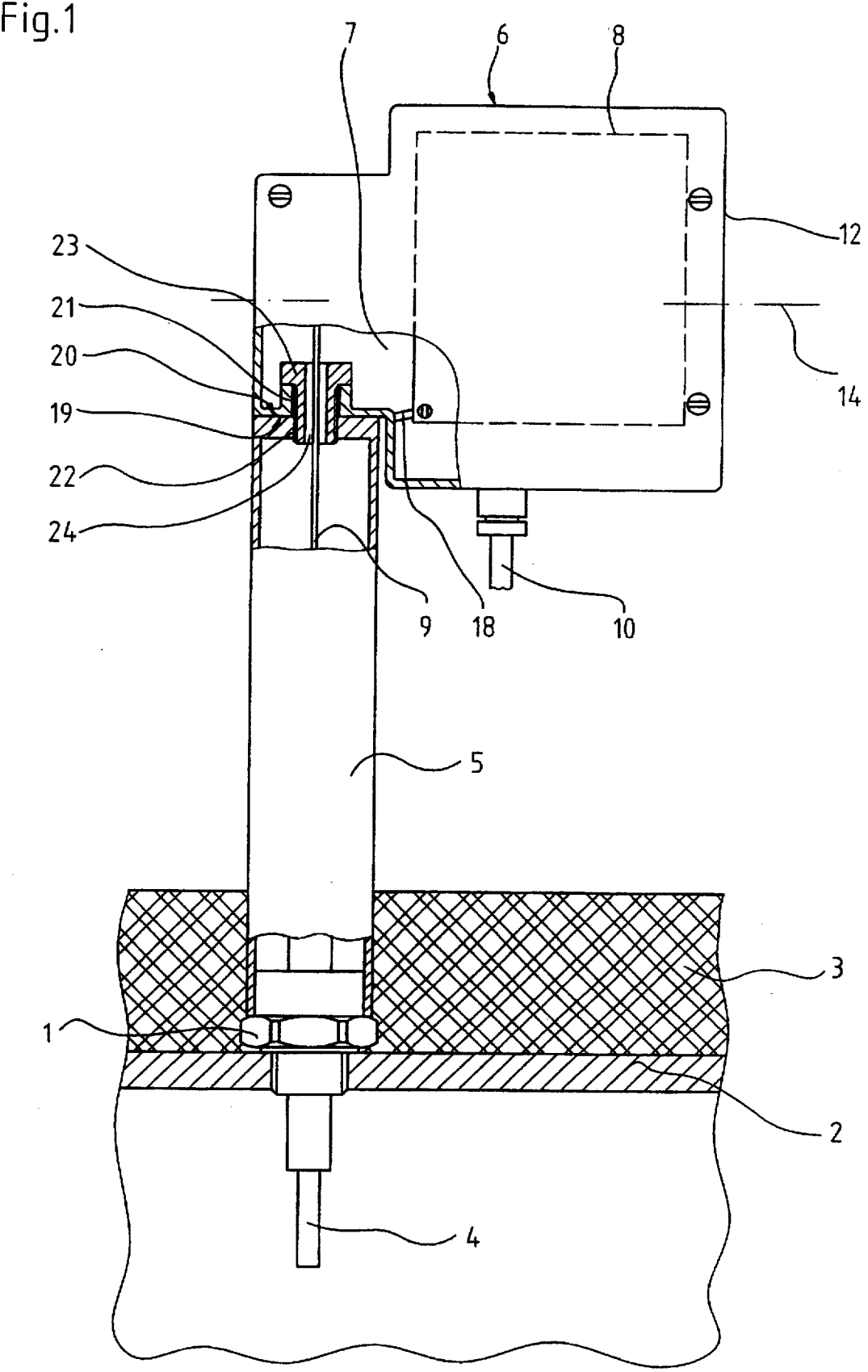
FIG. 1 is a side view of a probe, partially in cross-sectional representation.

Turning now in detail to the drawings, and in particular FIG. 1, the probe has a mounting housing 1, mounted on container 2 which has a heat insulator 3 on the outer side. On mounting housing 1, there is provided a sensor 4 projecting into container 2, the sensor being used to monitor the level of the medium filling container 2. External of container 2, mounting housing 1 supports a tubular neck part 5 extending away from container 2 and projecting away from heat insulator 3. A head housing 6 is arranged on the free end of neck part 5, the free end being remote from container 2. An electronic circuit 8 is disposed in the interior space 7 of the head housing. An electric conductor 9 extends through neck part 5 and connects sensor 4 with circuit unit 8, which in turn is connected to an electrical connection line 10.

Head housing 6 is designed as a flat body arranged in an upright position. The narrow side of the head housing, with its side facing mounting housing 1 and container 2, extends in a radial direction with respect to neck part 5. Head housing 6 has a smaller and a larger square section. The small section is arranged on the surface at the top of neck part 5. The larger section is present on one side next to neck part 5. Thus, the head housing is radially cantilevered on one side of neck part 5.

Figure 2:
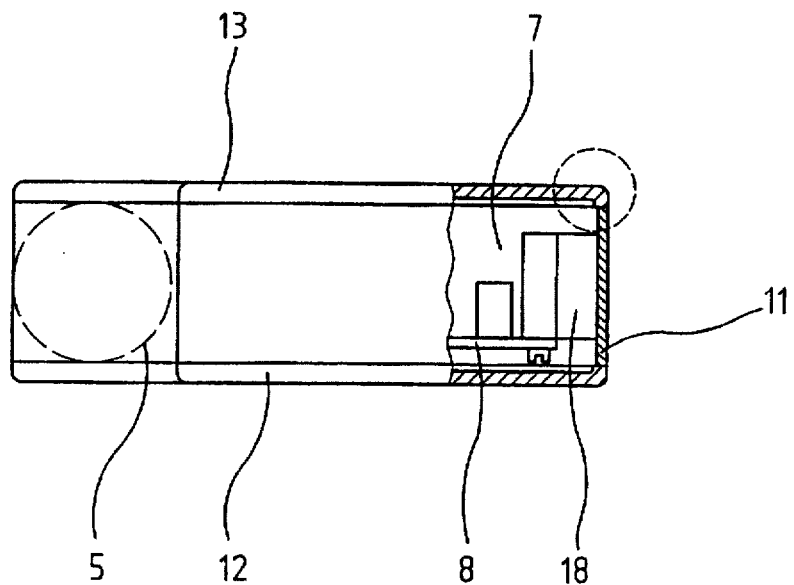
FIG. 2 is a top view of the head housing of the probe of FIG. 1, with a partially cross-sectional representation.
Figure 3:
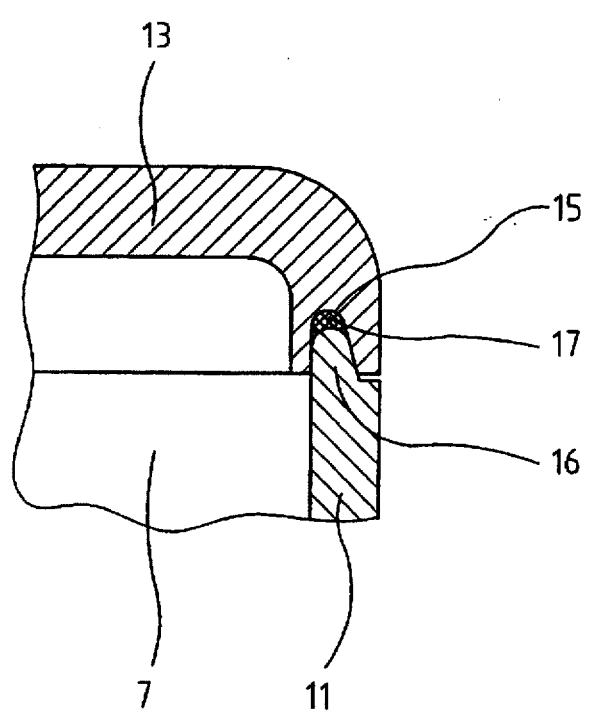
FIG. 3 is an enlarged detail of the head housing of the dotted portion of FIG. 2.

The narrow sides of head housing 6 are formed by a thin-walled frame 11 extending all around head housing 6, as shown in FIG. 2. Two covers 12 and 13 close frame 11 on both sides. Covers 12 and 13 form the broad sides of head housing 6, and have the same shape. The covers and the adjacent zones of frame 11 have a symmetric shape and outer contour based on an axis of symmetry 14 extending perpendicular to neck part 5. As shown in FIG. 3, the edge of covers 12 and 13 facing frame 11 are each provided with a receiving groove 15 extending all around the corners, the grooves each being engaged by a surrounding flange 16, so that head housing 6 is highly stable dimensionally in spite of the thin wall thickness of frame 11. A resilient seal 17 disposed in groove 16 of each of covers 12 and 13 provides a tight seal for head housing 6. Both covers 12 and 13 and frame 11 consist of metal. The are electrically conductive and also connect with each other in an electrically conductive way. Thus, any radiation of electromagnetic waves from the outside into head housing 6, or from head housing 6 to the outside is thus prevented.

Circuit unit 8 shown in FIGS. 2 and 3 is located in interior space 7 of head housing 6 within its larger, square block-shaped section. Holding ribs 18 are disposed on the inner side of frame 11 for holding circuit unit 8. The ribs are arranged between covers 12 and 13 as in FIG. 2 so that circuit unit 8 can be selectively inserted and fastened into interior space 7 from either of the broad sides of head housing 6. Therefore, depending on the need, circuit unit 7 can be installed after removing cover 12 or cover 13. If the circuit of circuit unit 8 cannot be accommodated on one board, two differently-sized boards may be used. The larger board could be mounted on holding ribs 18, while the smaller board could be disposed behind it between holding ribs 18 and would be fastened on the larger board by means of spacer bolts.

Head housing 6 and neck part 5 have corresponding support surfaces 19 and 20. Support surface 19 as seen in FIG. 1 is located on the distal surface of neck part 5, remote from mounting housing 1 and container 2. Support surface 20 is located within the smaller square block-shaped section on frame 11, on its side facing mounting housing 1 and container 2. Frame 11 has a center passage opening 21 within support surface 20 and the neck part 5 has a center threaded bore 22 within support surface 19. A mounting screw 23 extends through passage opening 21 from interior space 7. Screw 23 is screwed into threaded bore 22 and connects neck part 5 to head housing 6 in a detachable way. To make the connection, both support surfaces 19 and 20 are pressed into one another. A seal may be disposed between the surfaces, if necessary. Mounting screw 23 has a center passage 24 for conductor 9. Instead of using mounting screw 23, a threaded lug or threaded nipple extending through passage opening 21 may be used. The lug or nipple would then receive a mounting nut screwed onto it in interior space 7 (not shown).

If a high operating temperature is present in container 2, heat insulator 3 prevents unwanted dissipation of heat by container 2 into the environment. However, mounting housing 1 and neck part 5 heat up due to heat conduction. The temperature of neck part 5, however, decreases with increasing distance from container 2. There is a heated convection air flow that surrounds neck part 5 that develops from the heat in the container. The flow can take place without obstruction on a large section of the circumference of the neck part. There, the heated air is not surrounding head housing 6 and consequently will not heat it up. The convection flow impacts head housing 6 only on the one side of neck part 5, where head housing 6 is cantilevered. However, head housing 6 is facing such flow only with its narrow side, and only the part thereof directly adjacent to neck part 5 is within the range of the convection flow. A large part of head housing 6 is outside of the convection flow because of its radial spacing from neck part 5. Head housing 6 is unilaterally cantilevered, so that it is minimally exposed to the heat. Even a probe with a large-sized circuit unit 8 can thus be used on container 2 with a high operating temperature without any impermissibly high temperature occurring on circuit unit 8.

As an alternative to the vertical arrangement of neck part 5 shown in FIG. 1, the probe can be installed with neck part 5 extending inclined or horizontally (not shown). In such a case, head housing 6 is aligned so that it is pointing downwardly with one narrow side, i.e., it is arranged in an upright position. For aligning head housing 6, one of covers 12 and 13 is removed and mounting screw 23, disposed away from circuit unit 8, is loosened. Head housing 6 is then swiveled on neck part 5 into the required position. Subsequently, mounting screw 23 is tightened and the cover is replaced.

Figure 4:
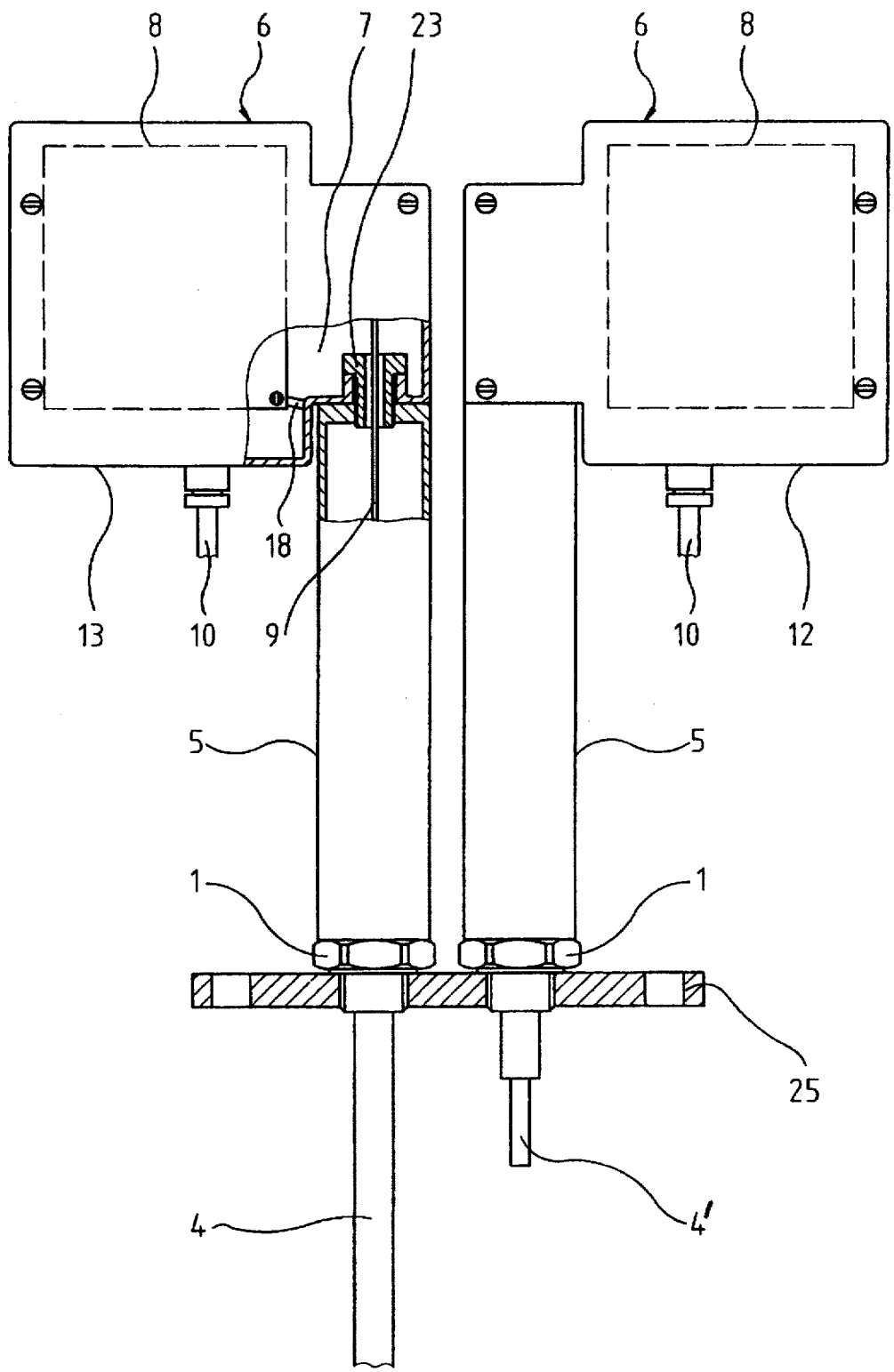
FIG. 4 is a side view of two probes arranged next to each other, on a different scale.

In FIG. 4, two probes are shown disposed next to each other on a flange 25. They are mounted on a corresponding connection flange of a container (not shown). The left probe has sensor 4 for continuously monitoring the liquid level, whereas the right probe is fitted with a sensor 4' for monitoring the maximum level of the liquid for safety reasons. Both probes have mounting housings 1 designed as screw nipples with a small diameter.

The first, right-hand probe can be completely screwed into flange 25. If head housing 6 is not pointing to the right, this can be changed in a simple way. After removing cover 12, mounting screw 23 is loosened (see FIG. 1), and head housing 6 is swiveled into the required position and mounting screw 23 is subsequently retightened. After the electric connection has been made between circuit unit 8 and connection line 10, cover 12 is remounted.

On the second, left-hand probe, at least one of covers 12 and 13 is removed, the electric connection between circuit unit 8 and conductor 9 is disconnected, mounting screw 23 is removed, and head housing 6 is removed from neck part 5. Mounting housing 1 of the left-hand probe is then screwed into flange 25 directly next to the right-hand probe. Thereafter, head housing 6 is placed on neck part 5, aligned, so as to point to the left, and then fastened with mounting screw 23. If necessary, circuit unit 8 can be detached from holding ribs 18 and changed from one side of the interior space to the other side, where it must be fastened again onto holding ribs 18. In each case, it is necessary to establish the electric connection between conductor 9 and circuit unit 8. One or both covers 12 and 13 are then refitted after connection line 10 has been connected.

Since head housings 6 of both probes are each unilaterally cantilevered on neck part 5 extending away from each other, both probes can be arranged next to one another with only a small spacing between mounting housings 1 in spite of large head housings 6.

Figure 5:
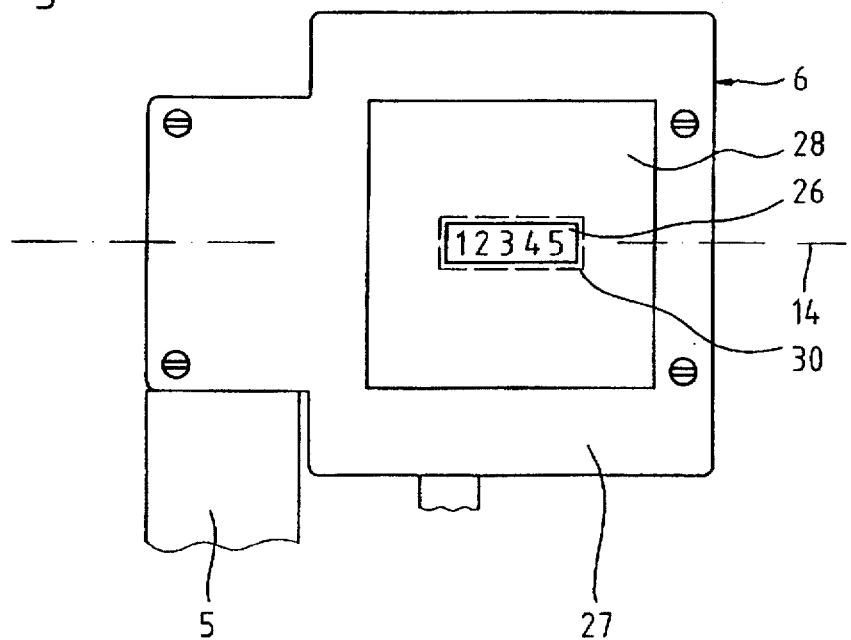
FIG. 5 shows a cutout of a probe with an indicating element and a head housing cantilevered to the right.
Figure 6:
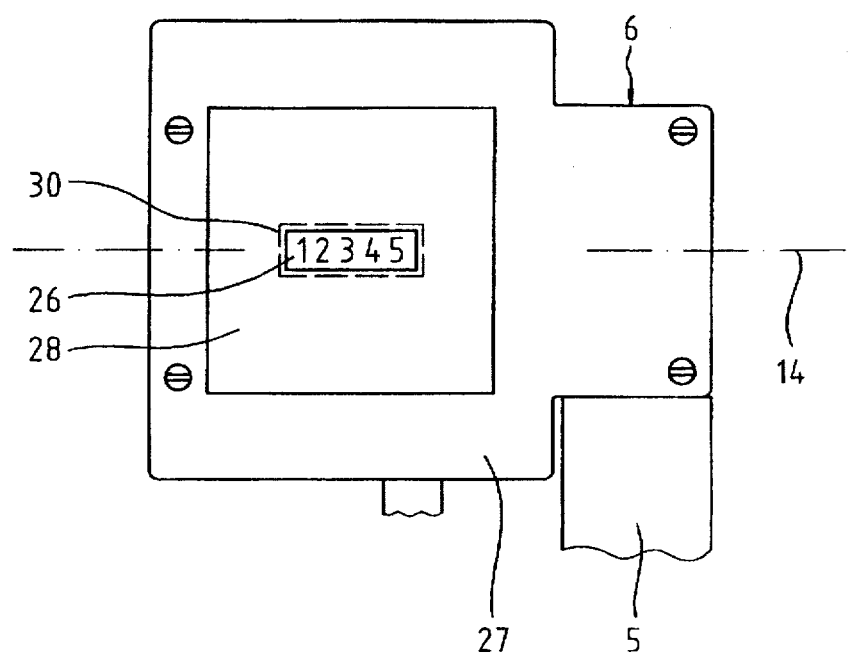
FIG. 6 shows the probe of FIG. 5 with its head housing cantilevered to the left.
Figure 7:
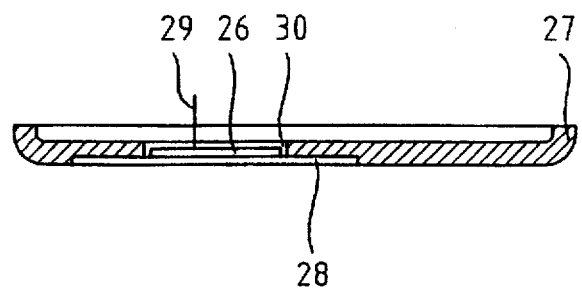
FIG. 7 shows a cross section of a cover of the probe of FIG. 5.

In FIGS. 5 and 6, the probe is fitted with an electrical indicating element 26 on a broad flat side of head housing 6 on the symmetrical axis 14. Indicating element 26 may indicate the actual value determined by sensor 4 or 4' of the probe, and/or the preset should-be value. Cover 27 of head housing 6 supports a front plate 28, on which indicating element 26 is arranged. Indicating element 26 has electrical connection conductors 29 (FIG. 7) for the connection to circuit unit 8, and cover 27 is provided with a passage opening 30. In spite of the different alignment of the head housing, i.e., cantilevered to the right or cantilevered to the left, the same cover 27 is used in FIGS. 5 and 6. It is only turned by 180°. Front plate 28 has the same position in both cases, i.e., the indicator of indicating element 26 is not head down. The passage opening 30 of cover 27 is positioned on the axis of symmetry 14 in a way such that it surrounds indicating element 26 in both positions of installation (FIGS. 5 and 6). This way, the required free space is available for indicating element 26 and for passing through connection conductors 29. Areas of passage opening 30 that remain open are closed by front plate 28.

Figure 8:
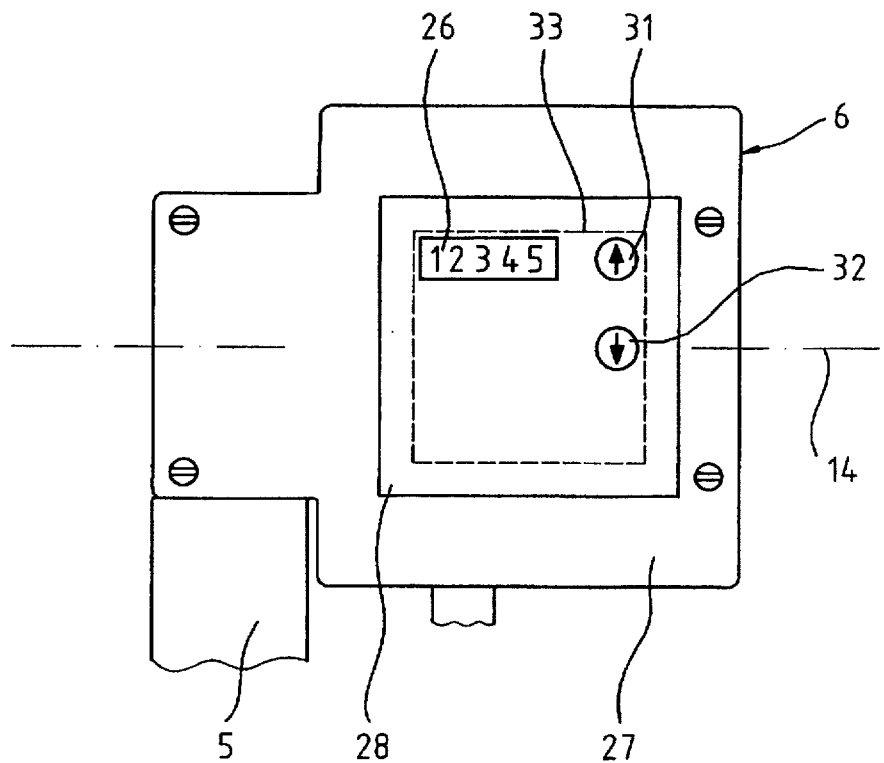
FIG. 8 shows a cutout of a probe with indicating and operating elements, and with its head housing cantilevered to the right.
Figure 9:
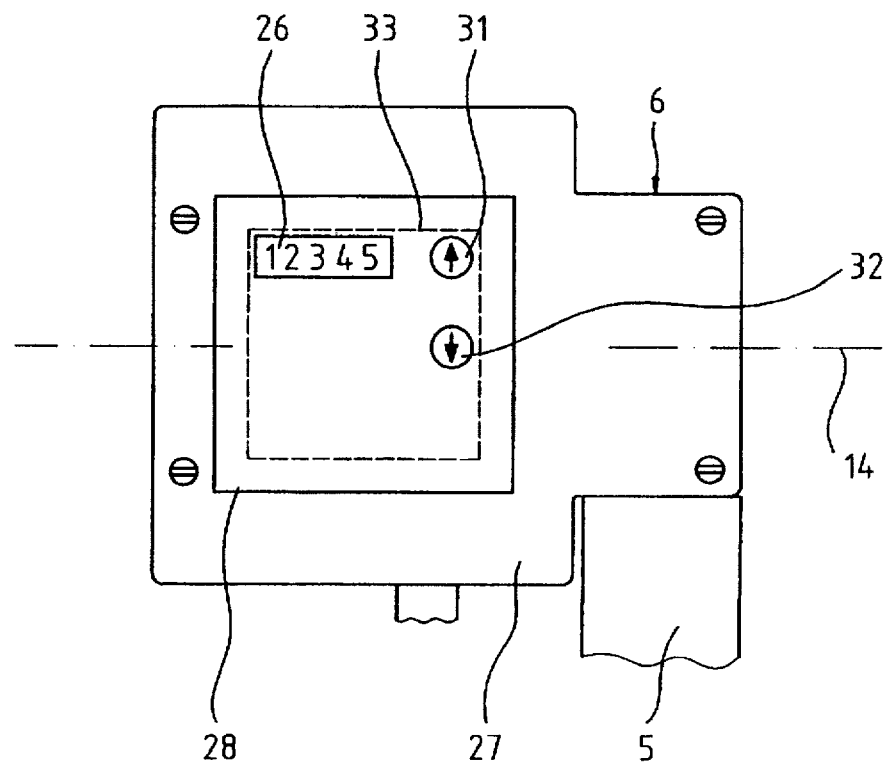
FIG. 9 shows the probe of FIG. 8 with its head housing cantilevered to the left.

In FIGS. 8 and 9, indicating element 26 is shown positioned above the axis of symmetry 14. Adjacent to it on the right is a first operating element 31, and a second operating element 32, positioned beneath first operating element 31 on the axis of symmetry 14. Operating elements 31 and 32 may be in the form of pressure switches that are capable of varying a predetermined value for the probe. Cover 27 has one single large passage opening 33 extending on both sides of the axis of symmetry 14 so that a part of passage opening 33 surrounds indicating element 26 and operating elements 31 and 32 in either position of installation of cover 27 (FIGS. 8 and 9). The single large passage opening 33 provides a great deal of freedom to position the indicating and operating elements 26, 31 and 32. Front plate 28, which is resistant to bending, covers the entire passage opening 33 and seals the area not occupied by indicating element 26 and operating elements 31 and 32.

Figure 10:
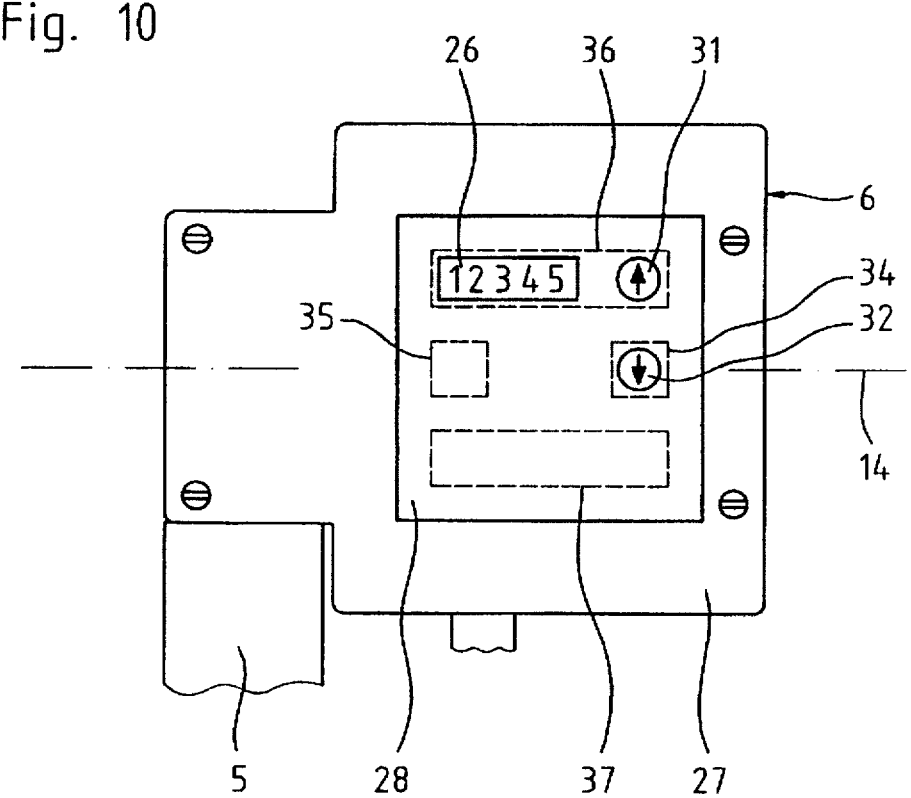
FIG. 10 shows a cutout of a second probe with indicating and operating elements, and with its head housing cantilevered to the right.
Figure 11:
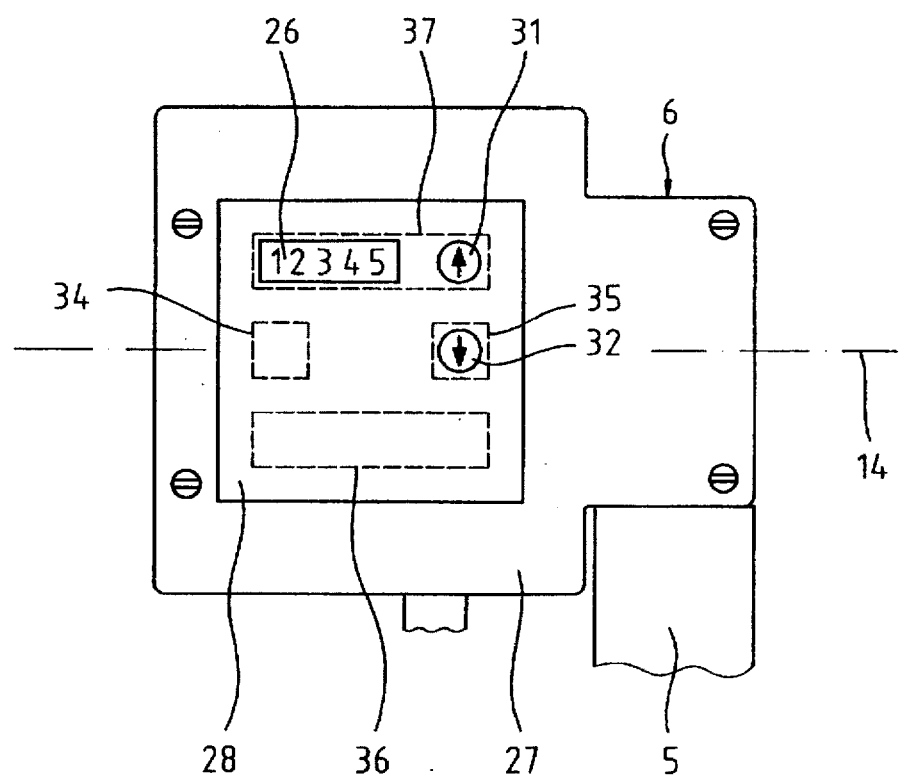
FIG. 11 shows the probe of FIG. 10 with its head housing cantilevered to the left.

The probe as shown in FIGS. 10 and 11 is different from the probe described above, in that instead of a single large passage opening, there are four smaller passage openings 34, 35, 36 and 37 in cover 27. Two passage openings 34 and 35 are located on the axis of symmetry 14, whereas the other two passage openings 36 and 37 are positioned above and below the axis of symmetry 14. Passage openings 34 to 37 are positioned and designed so that in one position of installation of cover 27 (FIG. 10), passage opening 36 surrounds indicating element 26 and operating element 31, and passage opening 34 surrounds operating element 32. In the other position of installation of cover 27 (FIG. 11), passage opening 37 surrounds indicating element 26 and operating element 31, whereas passage opening 35 surrounds operating element 32. Free areas of the openings and free passage openings are sealed by front plate 28. In view of the relatively small dimensions of passage openings 34 to 37, front plate 28 does not have a high resistance to bending. Foils with less resistance to bending may be used instead of plates with higher resistance to bending.

The size of passage openings 30 and 33 to 37 is dependent upon whether the indicating and operating elements 26, 31 and 32 themselves project into or through the openings, or only their connection conductors 29. The indicating and operating elements 26, 31 and 32 may be disposed on front plate 28, or alternatively on circuit unit 8 from where they project to front plate 28. If indicating and operating elements 26, 31 and 32 are designed very flat and integrated in front plate 28 without protruding from it, only their connection conductors 29 extend through passage openings 30, and 33 to 37.

The present invention is not limited to probes with level sensors, but is also suitable for probes with other sensors for monitoring a medium in a container, such as temperature sensors, pressure sensors, and conductivity sensors. The probes can also be used within a wide temperature range, not only at high operating temperatures.

While several embodiments of the present invention have been shown and described, it is to be understood that many changes and modifications may be made thereunto without departing from the spirit and scope of the invention as defined in the appended claims.

What is claimed is:

1. A probe for monitoring a fluid medium in a container, comprising:

a mounting housing capable of mounting the probe on the container;

at least one sensor arranged on the mounting housing;

a neck part having a first end and a second end, said neck part attached at the first end to the mounting housing;

an electrical conductor extending through said neck part and connected to said sensor;

a head housing attached to the second end of the neck part;

an electrical circuit disposed within the head housing and connected to the electrical conductor;

wherein the dimensions of the head housing, measured in the radial direction of the neck part, are greater than dimensions of the neck part; and wherein the head housing is mounted on the neck part so that the head housing is radially cantilevered on one side of the neck part.

2. The probe according to claim 1, wherein said head housing comprises a flat body having of two flat sides and a plurality of narrow sides, and is mounted so that it extends in the radial direction of the neck part, and wherein one of said narrow sides faces the mounting housing.

3. The probe according to claim 2, wherein the narrow sides of said head housing comprise a frame, and said flat sides comprise two covers.

4. The probe according to claim 3, further comprising holding means for securing the circuit to the inside of the frame, such that the circuit may be mounted from either of said two flat sides of the head housing.

5. The probe according to claim 3, wherein the covers are symmetrical with respect to an axis of symmetry extending perpendicular to said neck part.

6. The probe according to claim 5, further comprising:

at least one externally visible indicating or operating element disposed on either of the two covers along the axis of symmetry, such that said indicating element is accessible from the outside; and at least one passage opening arranged on the axis of symmetry, through which said indicating or operating element may be connected to the circuit, such that the same cover may be used on either broad side of the head housing by rotating the cover 180° from one side of the head housing to the other.

7. The probe according to claim 5, further comprising:

at least one externally visible indicating element arranged on either of the two covers displaced from the axis of symmetry, wherein the indicating element is accessible from the outside;

at least one passage opening arranged on one cover on the axis of symmetry, said passage opening being large enough to surround the indicating or operating element and wherein the cover having the passage opening could be used on either broad side of the head housing by rotating the cover 180° from one side of the head housing to the other;

a front plate arranged on the cover having the passage opening, said front plate sealing the passage opening, and wherein said indicating element is located on said front plate.

8. The probe according to claim 5, further comprising:

a front plate arranged on one of said covers, at least one indicating or operating element arranged on the front plate displaced from the axis of symmetry and accessible from the outside; and at least one passage opening arranged on one cover and displaced from the axis of symmetry, said passage opening surrounding said indicating or operating element, wherein said indicating or operating element is connected to the circuit unit through said passage opening, wherein said front plate seals said passage opening, and wherein the passage opening is arranged such that the cover having the passage opening could be used on either broad side of the head housing by rotating the cover 180° from one side of the head housing to the other.

9. The probe according to claim 3, wherein said frame is thin-walled and said covers each contain a receiving groove on the side facing the frame, said groove extending around the perimeter of the cover and being adapted to engage the edge of said frame.

10. The probe according to claim 3, wherein said frame and said covers are made of metal and are connected to each other in an electrically conductive manner.

11. The probe according to claim 1, wherein said head housing has a square block-shaped portion disposed laterally next to the neck part and wherein said circuit unit is disposed within said square block-shaped portion.

12. The probe according to claim 1, further comprising:

support surfaces located on the head housing and the second end of the neck part, said support surfaces engaging each other and having a passage means for receiving an electrical conductor; and screw means extending through the support surfaces on said head housing and neck part, said screw means capable of securing the neck part to the head housing when tightened.

13. The probe according to claim 12, wherein said screw means contains a passageway for receiving an electrical conductor.

* * * * *